United States Patent
Hiramatsu

(10) Patent No.: US 9,433,031 B2
(45) Date of Patent: Aug. 30, 2016

(54) COMMUNICATION APPARATUS, CONTROL METHOD FOR THE SAME AND NON-TRANSITORY COMPUTER-READABLE STORAGE MEDIUM

(71) Applicant: CANON KABUSHIKI KAISHA, Tokyo (JP)

(72) Inventor: Tomoki Hiramatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/638,548

(22) Filed: Mar. 4, 2015

(65) Prior Publication Data
US 2015/0264740 A1    Sep. 17, 2015

(30) Foreign Application Priority Data
Mar. 11, 2014 (JP) ................... 2014-048075

(51) Int. Cl.
| H04B 5/00 | (2006.01) |
| H04W 76/06 | (2009.01) |
| H04W 4/00 | (2009.01) |
| H04W 8/00 | (2009.01) |
| H04W 36/14 | (2009.01) |
| H04W 88/06 | (2009.01) |
| H04B 5/02 | (2006.01) |
| H04W 84/12 | (2009.01) |

(52) U.S. Cl.
CPC ............. *H04W 76/064* (2013.01); *H04B 5/02* (2013.01); *H04W 4/008* (2013.01); *H04W 8/005* (2013.01); *H04W 36/14* (2013.01); *H04W 76/06* (2013.01); *H04W 88/06* (2013.01); *H04W 84/12* (2013.01)

(58) Field of Classification Search
CPC ...... H04B 5/02; H04W 84/18; H04W 88/06; H04M 1/7253
USPC .................... 455/41.1, 41.2, 552.1
See application file for complete search history.

(56) References Cited

U.S. PATENT DOCUMENTS

| 8,108,462 | B2 * | 1/2012 | Morotomi ......... H04M 1/72522 379/100.06 |
| 8,122,355 | B2 * | 2/2012 | Kii ........................ G06F 3/0481 715/716 |
| 9,218,110 | B2 * | 12/2015 | Morotomi ......... H04M 1/72522 |

(Continued)

FOREIGN PATENT DOCUMENTS

| EP | 2 434 793 A1 | 3/2012 | ............ H04W 12/06 |
| JP | 2007-221355 | 8/2007 | |

OTHER PUBLICATIONS

EP Application No. 15158602.1-1853—EP Search Report dated Jul. 14, 2015.

*Primary Examiner* — April G Gonzales
(74) *Attorney, Agent, or Firm* — Fitzpatrick, Cella, Harper & Scinto

(57) ABSTRACT

The present invention provides a technique that, in the case where a first radio communication unit has acquired device information, and the execution of a service has started, makes it possible to detect the stopping of execution of the service by a second radio communication unit. To achieve this, device information regarding another communication apparatus is acquired via the first radio communication unit, and if a predetermined service is being executed with the other communication apparatus based on the acquired device information, a predetermined signal indicating stopping of the predetermined service is detected via the second radio communication unit that is different from the first radio communication unit. If the predetermined signal is detected, processing for stopping the predetermined service is performed.

10 Claims, 16 Drawing Sheets

(56) References Cited

U.S. PATENT DOCUMENTS

| | | | |
|---|---|---|---|
| 2007/0001853 A1* | 1/2007 | Otranen | G06K 7/0008 340/572.1 |
| 2007/0168425 A1* | 7/2007 | Morotomi | H04M 1/72522 709/204 |
| 2012/0102117 A1* | 4/2012 | Morotomi | H04M 1/72522 709/204 |
| 2012/0317194 A1* | 12/2012 | Tian | H04W 8/005 709/204 |
| 2014/0136979 A1* | 5/2014 | Morotomi | H04M 1/72522 715/716 |

* cited by examiner

FIG. 10

1000 — DEVICE MANAGEMENT TABLE

| | | | |
|---|---|---|---|
| | 1 | DEVICE IDENTIFIER | 00000000-0000-0000-0001-AAAAAAAAAAAA |
| 1001 | | IP ADDRESS | 192.168.0.2 |
| 1002 | | PORT NUMBER | 8615 |
| 1003 | | MODEL NAME | MobileOS 4.0/ABC |
| 1004 | | NICKNAME | Maty's SmartPhone |
| 1005 | | VENDOR NAME | Mobile Inc. |
| 1006 | | SERVICE TYPE | CameraConnectedMobile |
| 1007 | | SERVICE VERSION | 1 |
| 1008 | | EXTENSION FUNCTION INFORMATION | 1.0 |
| 1009 | | VENDOR EXTENSION INFORMATION | Vender Extention |
| 1010 | | DEVICE INFORMATION ACQUISITION URL | /aaa/device.xml |
| 1011 | | REGISTRATION STATE | NFC & WIRELESS LAN |
| 1012 | 2 | DEVICE IDENTIFIER | 00000000-0000-0000-0001-BBBBBBBBBBBB |
| | | IP ADDRESS | 192.168.0.3 |
| | | PORT NUMBER | 8615 |
| | | MODEL NAME | Camera OS/PS-123 |
| | | NICKNAME | Tommy's Camera |
| | | VENDOR NAME | Ganon Inc. |
| | | SERVICE TYPE | MobileConnectedCamera |
| | | SERVICE VERSION | 1 |
| | | EXTENSION FUNCTION INFORMATION | 1.1 |
| | | VENDOR EXTENSION INFORMATION | Vender Extention |
| | | DEVICE INFORMATION ACQUISITION URL | /bbb/device.xml |
| | | REGISTRATION STATE | WIRELESS LAN |
| | 3 | DEVICE IDENTIFIER | 00000000-0000-0000-0001-CCCCCCCCCCCC |
| | | IP ADDRESS | 192.168.0.4 |
| | | PORT NUMBER | 8615 |
| | | MODEL NAME | CameraOS/IS-456 |
| | | NICKNAME | Bob's Camera |
| | | VENDOR NAME | Ganon Inc. |
| | | SERVICE TYPE | MobileConnectedCamera |
| | | SERVICE VERSION | 1 |
| | | EXTENSION FUNCTION INFORMATION | 1.0 |
| | | VENDOR EXTENSION INFORMATION | Vender Extention |
| | | DEVICE INFORMATION ACQUISITION URL | /ccc/device.xml |
| | | REGISTRATION STATE | NFC |

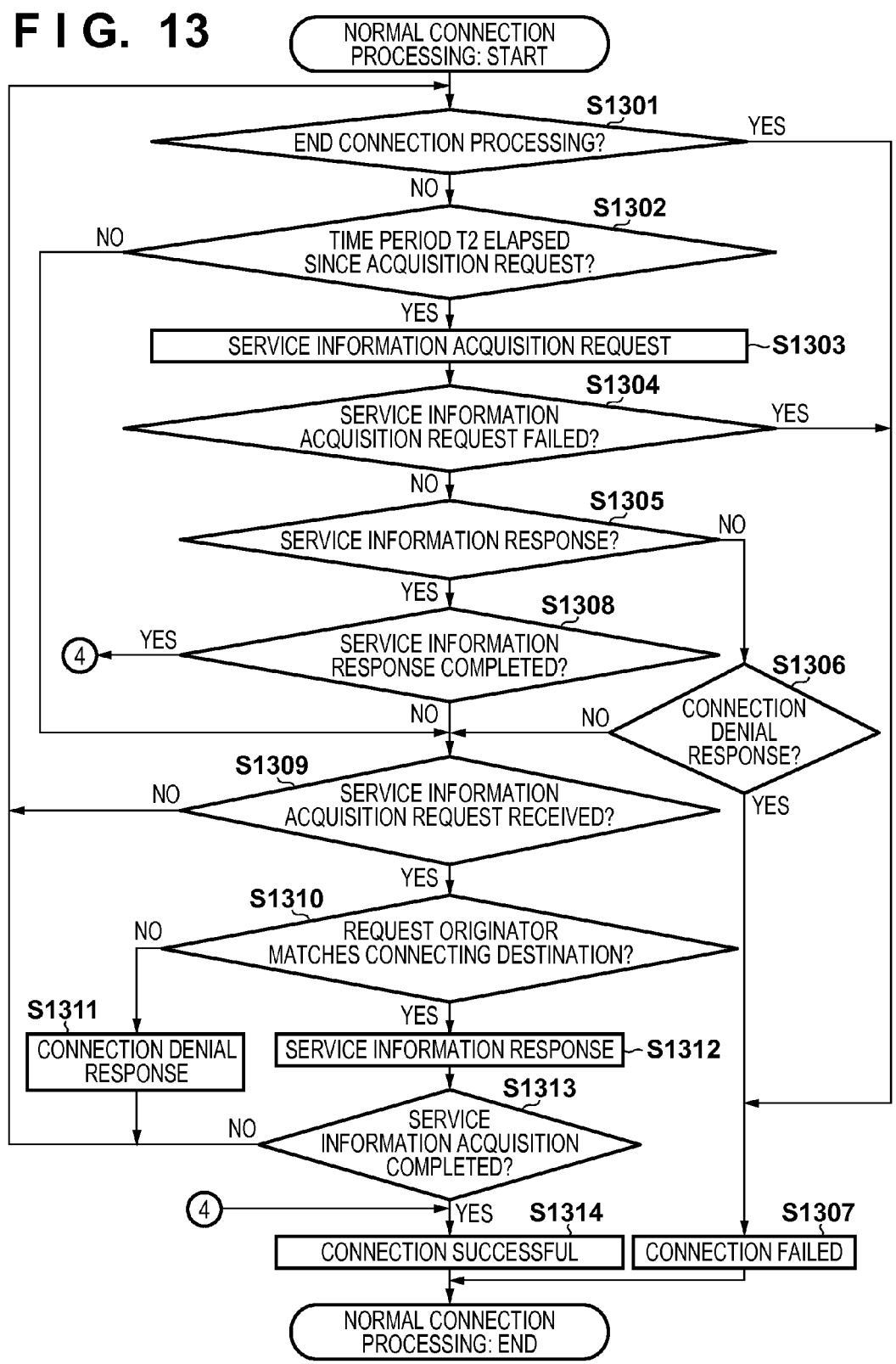

COMMUNICATION APPARATUS, CONTROL METHOD FOR THE SAME AND NON-TRANSITORY COMPUTER-READABLE STORAGE MEDIUM

BACKGROUND OF THE INVENTION

1. Field of the Invention

The present invention relates to a communication apparatus that executes a service with another communication apparatus using radio communication, and in particular relates to a communication apparatus that, in the case where device information has been acquired from another communication apparatus using proximity communication, and the execution of a service over radio communication has started, realizes the detection of the disappearance of another communication apparatus.

2. Description of the Related Art

Recent years have seen the beginning of the use of proximity communication such as NFC (Near Field Communication), IrDA (Infrared Data Association), and TransferJet (registered trademark). Users can exchange data between two communication devices by merely performing an operation such as bringing the communication devices close to each other (e.g., see Japanese Patent Laid-Open No. 2007-221355).

Also, the NFC Forum has standardized a protocol for handover from NFC to a different radio communication system such as Wi-Fi (Wireless Fidelity) or Bluetooth (registered trademark).

Meanwhile, there is a communication protocol for searching for services provided by other communication devices and notifying other communication devices of self-provided services (service discovery protocol). Some examples of this include the Simple Service Discovery Protocol (SSDP) and Multicast Domain Name Service (MDNS). Generally, when a service discovery protocol is used over Wi-Fi, several seconds to ten or more seconds is required to discover counterpart devices, and the users need to wait this amount of time between bringing their communication devices close together and finding out whether or not services can be executed, which has the possibility of significantly impairing the usability of the system. To address this, there is a method of using proximity communication to acquire device information regarding services provided by communication apparatuses.

However, in the aforementioned method, in the case where device information has been acquired via proximity communication, and the execution of a service over radio communication has started, it is not possible to detect the disappearance of the counterpart communication apparatus. For this reason, there is a problem in that it is not possible to end the service execution at an appropriate timing.

SUMMARY OF THE INVENTION

The present invention has been achieved in light of the above-described circumstances, and the present invention is to provide technique in which, in the case where a first radio communication unit has acquired device information, and a service has been started, it is possible to detect the stopping of the service by a second radio communication unit.

According to a first aspect of the present invention there is provided a communication apparatus comprising: a first acquisition unit that acquires device information regarding another communication apparatus via a first radio communication unit; and a detection unit that, when a predetermined service is being executed with the other communication apparatus based on the device information acquired by the first acquisition unit, detects a predetermined signal of the predetermined service via a second radio communication unit that is different from the first radio communication unit, wherein the communication apparatus is arranged to perform processing for stopping the predetermined service if the predetermined signal is detected by the detection unit.

According to a second aspect of the present invention there is provided a control method for a communication apparatus, the method comprising: acquiring device information regarding another communication apparatus via a first radio communication unit; attempting to detect a predetermined signal of the predetermined service via a second radio communication unit that is different from the first radio communication unit if a predetermined service is being executed with the other communication apparatus based on the acquired device information; and performing processing for stopping the predetermined service if the predetermined signal was detected.

According to embodiments of the present invention, in the case where a first radio communication unit has acquired device information, and a service has been started, it is possible to detect the stopping of the service by a second radio communication unit, and to end the service at an appropriate timing.

Further features will become apparent from the following description of exemplary embodiments with reference to the attached drawings.

BRIEF DESCRIPTION OF THE DRAWINGS

FIG. 10 is a diagram showing an example of a device management table used in the digital camera and the smart device.

FIG. 13 is a flowchart of normal connection processing executed by the digital camera and the smart device according to a second embodiment.

DESCRIPTION OF THE EMBODIMENTS

Hereinafter, embodiments will be described in detail with reference to the accompanying drawings. Note that the technical scope of the present invention is defined by the claims, the individual embodiments described below are merely examples, and the present invention is not intended to be limited by these embodiments.

Embodiments

Figure 1:
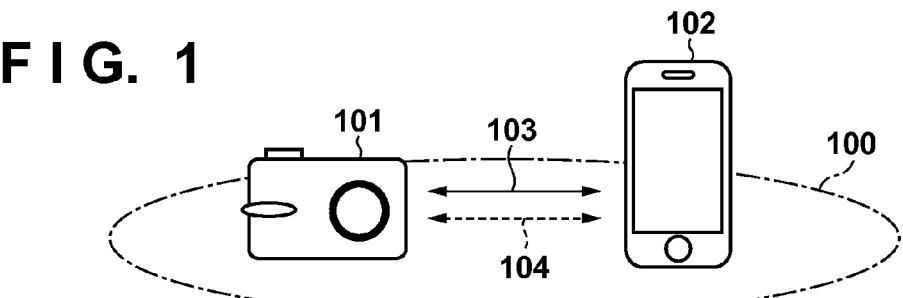
FIG. 1 is a network configuration diagram according to an embodiment of the present invention.

FIG. 1 is a configuration diagram of a system 100 of the embodiments. The system 100 is constituted by two devices, namely a digital camera 101 and a smart device 102. In the embodiments, the digital camera 101 and the smart device 102 both have hardware for performing NFC (Near Field Communication) communication 103 and wireless LAN communication 104, and can communicate with each other using this hardware.

Figure 2:
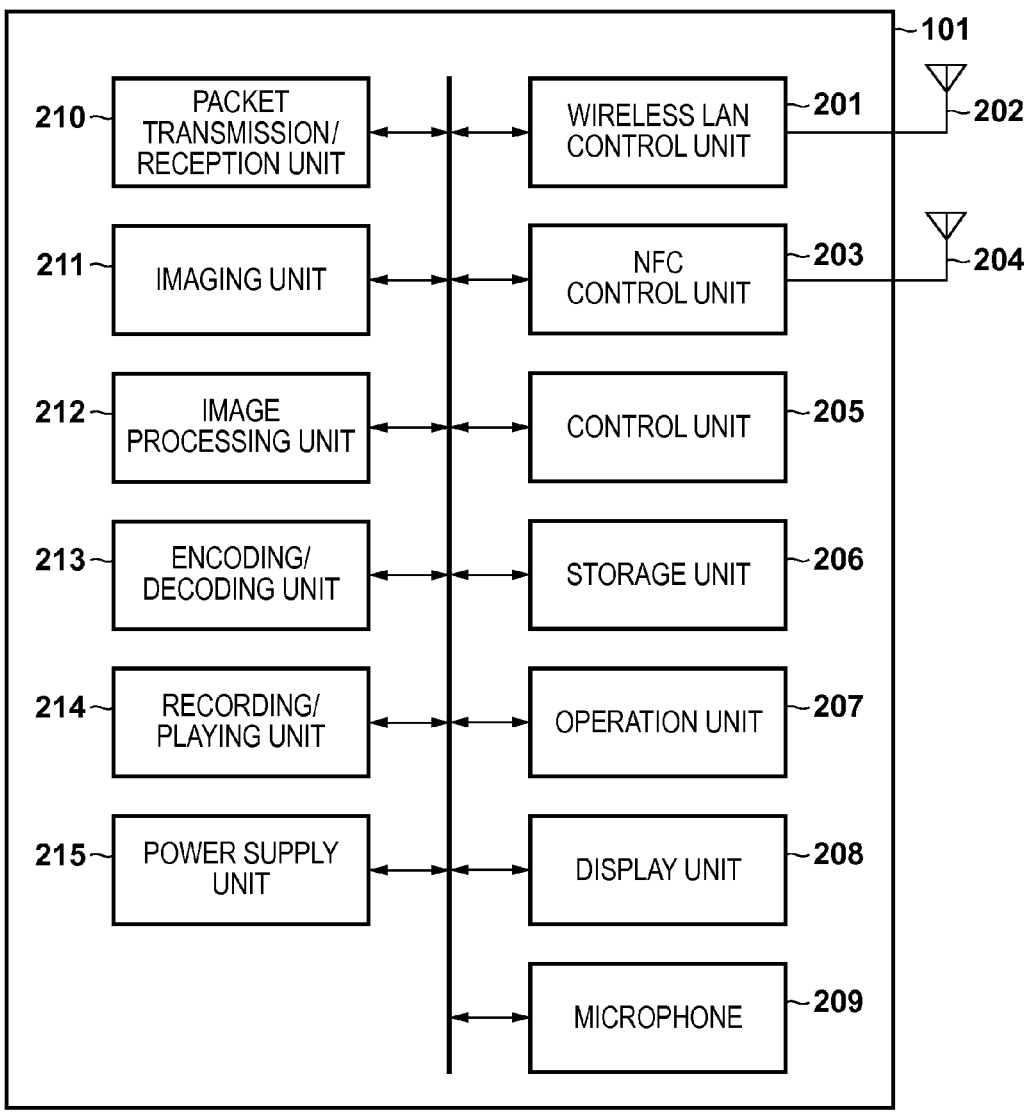
FIG. 2 is a block diagram showing a configuration of a digital camera.

FIG. 2 is a block diagram showing an example of the configuration of the digital camera 101 of the embodiments. In this figure, a wireless LAN control unit 201 performs wireless LAN RF control, wireless LAN communication processing, various types of control of wireless LAN communication compliant with the IEEE 802.11 series, and protocol processing related to wireless LAN communication. An antenna 202 performs wireless LAN communication. An NFC control unit 230 performs NFC RF control, NFC communication processing, various types of control of NFC communication, and protocol processing related to NFC communication. An antenna 204 performs NFC communication. A control unit 205 performs overall control of the digital camera 101 by executing a control program stored in a storage unit 206, and this control unit 205 is constituted by a CPU as well as a ROM, a RAM, and the like. A storage unit 206 stores the control program executed by the control unit 205, and various types of information such as parameters necessary for communication. Various types of later-described operations are performed by the control unit 205 executing the control program stored in the storage unit 206. An operation unit 207 is used for operating the digital camera 101 and is constituted by a touch panel, various types of switches, buttons, and the like. A display unit 208 displays various types of screens and has a function capable of outputting visually recognizable information as with an LCD or an LED, or outputting audio from a speaker or the like. The reference 209 denotes a microphone. A packet transmission/reception unit 210 transmits and receives packets involved in various types of communication. An imaging unit 211 captures an optical image of a subject. An image processing unit 212 converts captured images output from the imaging unit 211 into image data in a predetermined format, and performs various types of processing such as luminance and color correction on the image data. An encoding/decoding unit 213 performs predetermined high efficiency encoding (e.g., variable length encoding after quantization or DCT) on image data output from the image processing unit 212. A recording/playing unit 214 records the compressed and encoded image data to a recording medium (e.g., a removable memory card) that is not shown, and plays back recorded image data. A power supply unit 215 supplies power to the digital camera 101.

Figure 3:
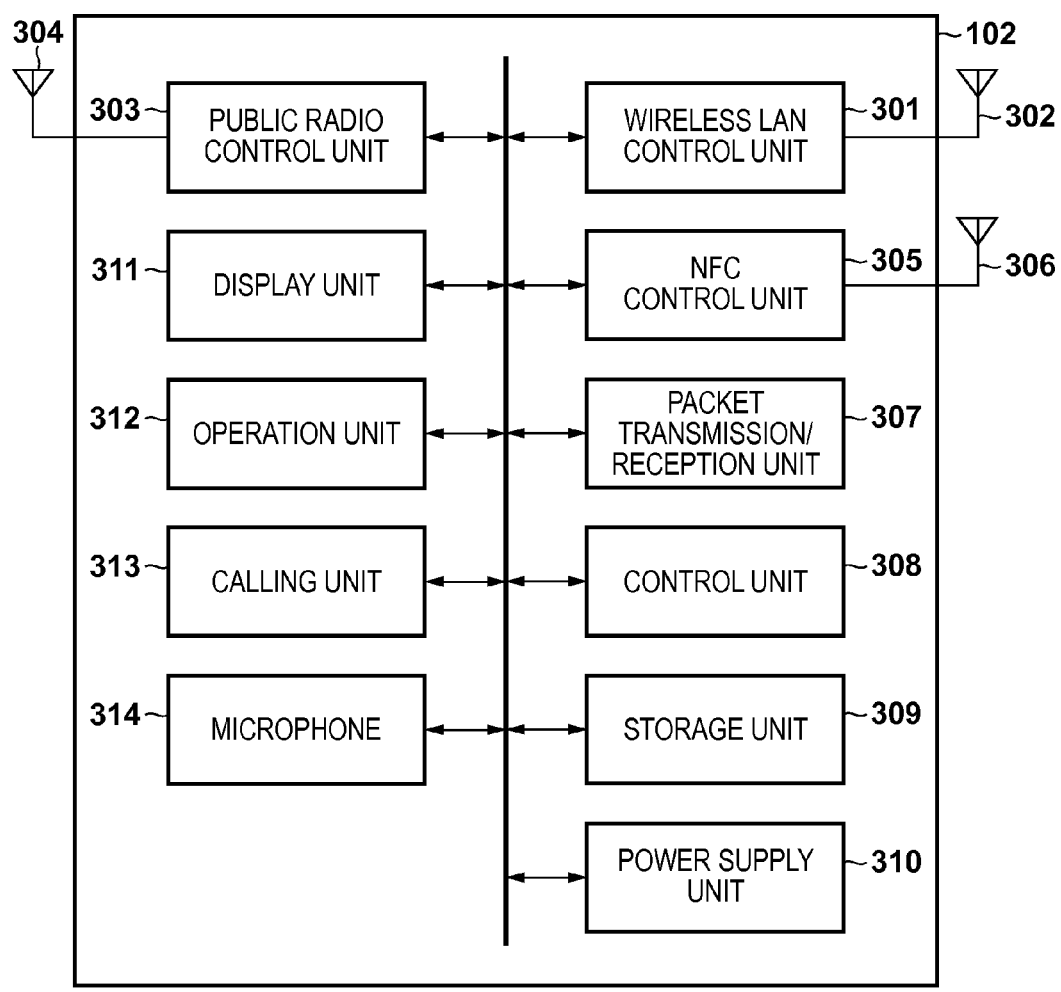
FIG. 3 is a block diagram showing a configuration of a smart device.

FIG. 3 is a block diagram showing an example of the configuration of the smart device 102 of the embodiments. A smartphone is envisioned as the smart device in the embodiments.

In this figure, a wireless LAN control unit 301 performs wireless LAN RF control, wireless LAN communication processing, various types of control of wireless LAN communication compliant with the IEEE 802.11 series, and protocol processing related to wireless LAN communication. An antenna 302 performs wireless LAN communication. A public radio control unit 303 performs public radio communication RF control, public radio communication processing for performing public radio communication, various types of control of public radio communication, and protocol processing related to public radio communication. This public radio communication is compliant with the IMT (International Multimedia Telecommunications) standard, the LTE (Long Term Evolution) standard, or the like. An antenna 304 performs public radio communication. An NFC control unit 305 performs NFC RF control, NFC communication processing, various types of control of NFC communication, and protocol processing related to NFC communication. An antenna 306 performs NFC communication. A packet transmission/reception unit 307 transmits and receives packets involved in various types of communication. A control unit 308 performs overall control of the smart device 102 by executing a control program stored in a storage unit 309, and this control unit 308 is constituted by a CPU as well as a ROM, a RAM, and the like. A storage unit 309 stores the control program executed by the control unit 308, and various types of information such as parameters necessary for communication. Various types of later-described operations are performed by the control unit 308 executing the control program stored in the storage unit 309. A power supply unit 310 supplies power to the smart device 102. A display unit 311 displays various types of screens and has a function capable of outputting visually recognizable information as with an LCD or an LED, or outputting audio from a speaker or the like. An operation unit 312 is used for operating the smart device 102 and is constituted by a touch panel, various types of switches, buttons, and the like. A calling unit 313 enables a call to be made by a user and the reference 314 denotes a microphone.

All of the function blocks have software or hardware relationships with each other. Also, the above-described function blocks are merely examples, and multiple function blocks may constitute one function block, or any of the function blocks may be further divided into blocks for performing respective functions. Note that the service provided by the digital camera 101 described below refers to the transmission of a captured image to a communication partner apparatus (the smart device 102 in the embodiments), but it will be appreciated that this is merely one example.

First Embodiment

The following describes device cooperation processing performed by the digital camera 101 and the smart device 102 of a first embodiment with reference to FIGS. 4 to 12.

First, a device management table will be described with reference to FIG. 10. A device management table 1000 is a table in which information necessary for device cooperation is managed in association with respective devices. Both the digital camera 101 and the smart device 102 store the device management table although the stored content can possibly be different.

The device management table 1000 can store information regarding multiple devices. The information regarding each device has information elements such as a device identifier 1001, an IP address 1002, a port number 1003, a model name 1004, a nickname 1005, a vendor name 1006, a service type 1007, a service version 1008, extension function information 1009, vendor extension information 1010, a device information acquisition URL 1011, and a registration state 1012. The device identifier 1001 is an identifier that uniquely identifies the device, such as a UUID (Universally Unique Identifier). The IP address 1002 and the port number 1003 are the IP address and the port number of the device for performing service execution. The model name 1004 is device type information, and is defined by an appropriate character string. The nickname 1005 is a simple name for allowing the user to identify the device, and is defined by an appropriate character string. The vendor name 1006 is the name of the device distributor, manufacturer, or the like, and is defined by an appropriate character string. The service type 1007 is an identifier that uniquely identifies the service provided by the device. The service version 1008 is version information regarding the service type 1007. The extension function information 1009 is version information regarding extended services that can be provided besides the service indicated by the service type 1007. The vendor extension information 1010 is an appropriate character string that can be extended by the vendor. The device information acquisition URL 1011 is URL information for acquiring the device information pieces 1001 to 1010 via a wireless LAN. The registration state 1012 is the registration state of the above device information. Examples of states include the state where device information acquired via NFC (the first radio communication unit) was manually registered, the state where device information acquired via a wireless LAN (the second radio communication unit) was manually registered, and the state where device information was acquired via both NFC and a wireless LAN and then registered.

Figure 4A:
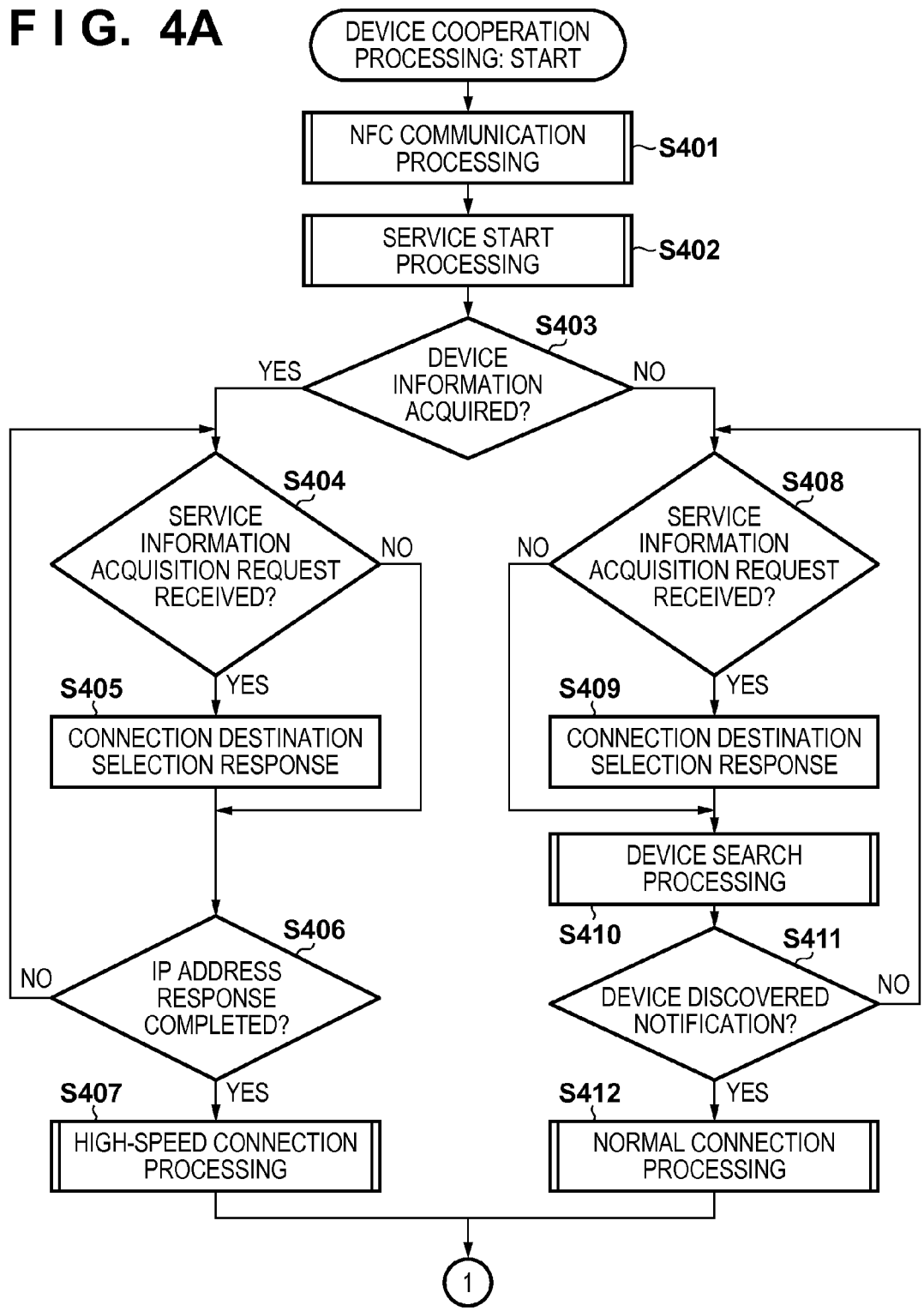
FIGS. 4A and 4B are flowcharts of device cooperation processing executed by the digital camera and the smart device according to an embodiment.
Figure 4B:
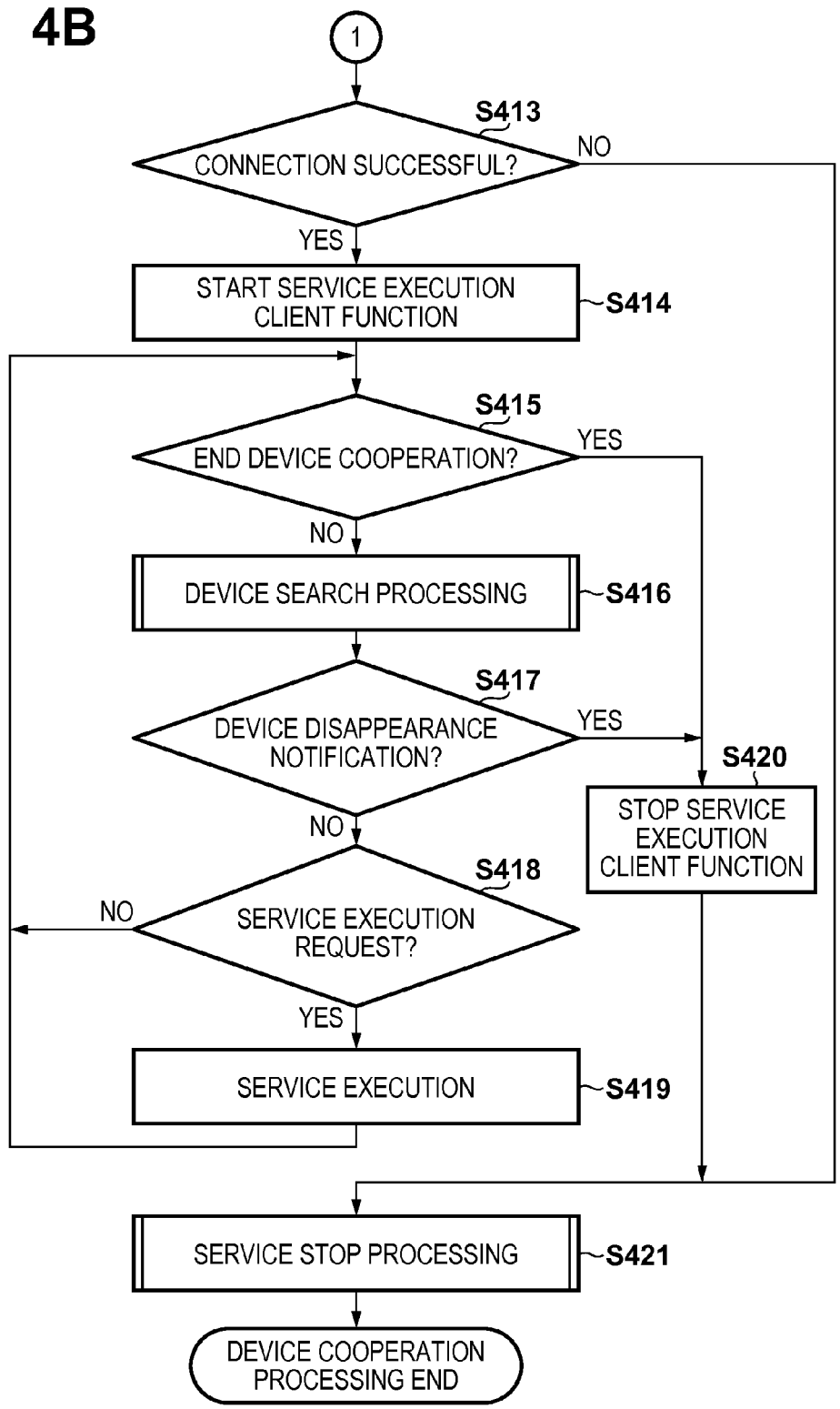
Figure 5:
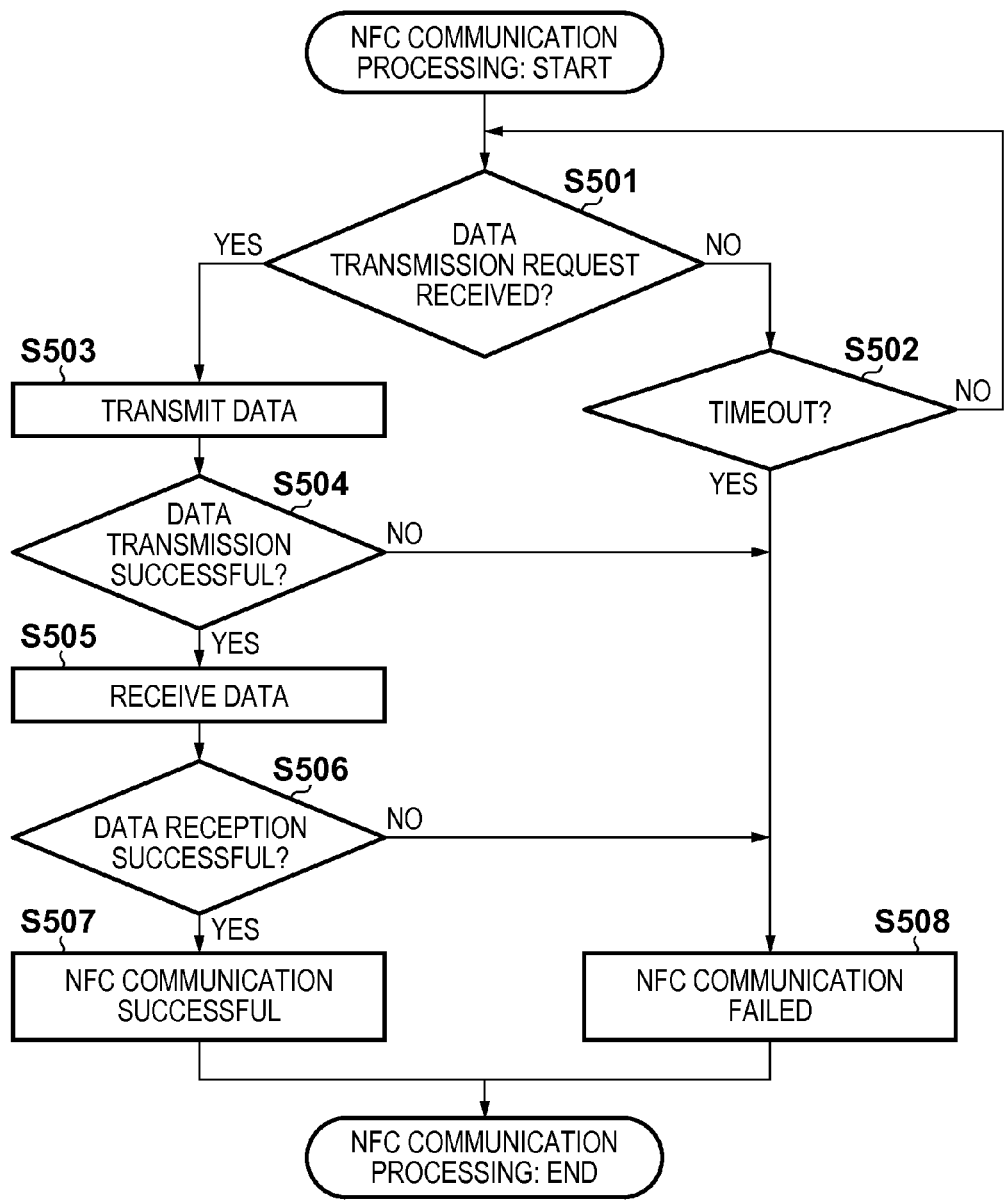
FIG. 5 is a flowchart of NFC communication processing executed by the digital camera and the smart device.
Figure 6:
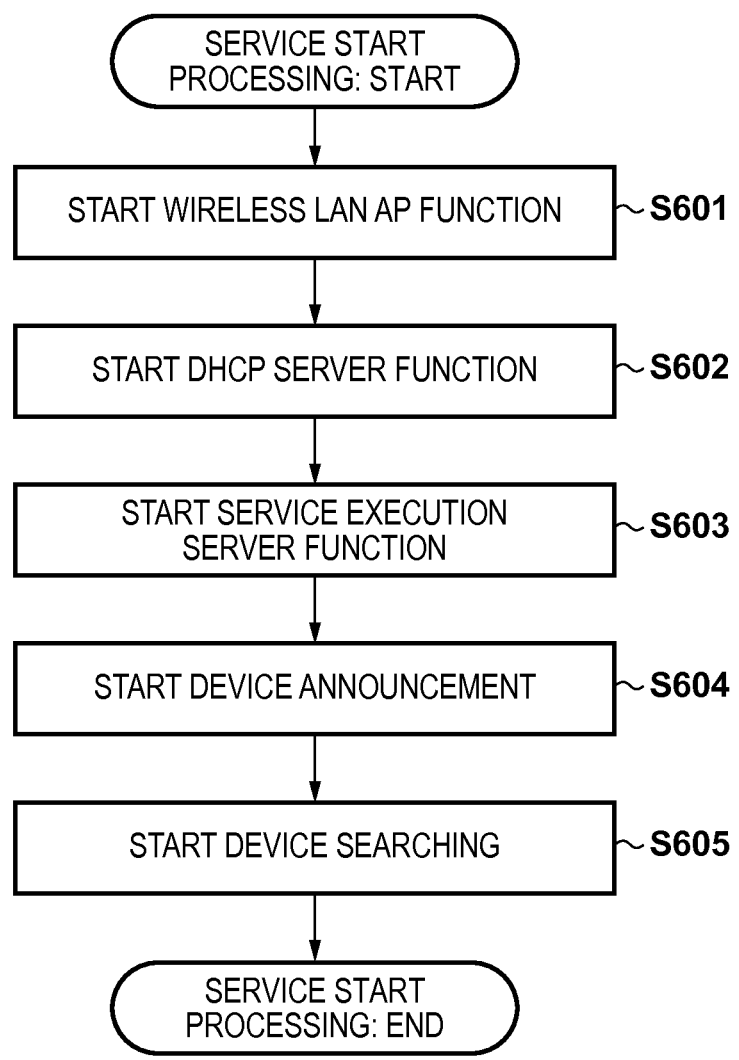
FIG. 6 is a flowchart of service start processing executed by the digital camera and the smart device.

FIGS. 4A and 4B show the flow of operations when starting device cooperation processing in the digital camera 101. In the present embodiment, it is envisioned that device cooperation processing is executed using the detection of the proximity of the smart device 102 by NFC as the trigger, but there is no limit to this. For example, device cooperation processing may be executed using the operation of a button of the digital camera 101 or the like as the trigger.

First, in step S401, the control unit 205 starts NFC communication processing. The following describes NFC communication processing with reference to FIG. 5. In step S501, it is determined whether or not a data transmission request has been received from an external apparatus (the smart device 101 in this embodiment) by NFC communication. The procedure moves to step S503 if a data transmission request has been received, and moves to step S502 if a data transmission request has not been received. In step S502, it is determined whether or not a transmission request reception timeout has occurred. If a timeout has not occurred, the procedure returns to step S501, whereas if a timeout has occurred, the procedure moves to step S508, in which it is determined that NFC communication failed, and NFC communication processing is ended. If the result of the determination in step S501 indicates the reception of a data transmission request, the control unit 205 performs data transmission by NFC communication in step S503, and then the procedure moves to step S504. In the present embodiment, it is envisioned that the data transmitted by NFC communication in the present embodiment is application startup information, wireless LAN connection information, device information, or the like, but there is no limitation to this. Note that the wireless LAN connection information includes an SSID (Service Set Identifier), a password, or the like. Also, the application startup information includes an application URI scheme, package name, or the like. In step S504, it is determined whether or not data transmission by NFC communication was successful. If the data transmission was successful, the procedure moves to step S505, whereas if the data transmission was not successful, the procedure moves to step S508, in which it is determined that NFC communication failed, and NFC communication processing is ended. In step S505, the control unit 205 performs data reception by NFC communication, and then the procedure moves to step S506. In the present embodiment, the data received by NFC communication is wireless LAN connection information, device information, or the like, but there is no limitation to this. In step S506, the control unit 205 determines whether or not data reception by NFC communication was successful. If the data reception was successful, the procedure moves to step S507, in which it is determined that NFC communication was successful, and then NFC communication processing is ended, whereas if the data reception failed, the procedure moves to step S508, in which it is determined that NFC communication failed, and NFC communication processing is ended. Note that the determinations of whether or not data transmission and data reception were successful in step S504 and step S506 are made based on the existence/absence of an NFC communication interruption caused by user separation of the digital camera 101 and the smart device 102, the existence/absence of data loss caused by a communication error, or the like, but there is no limitation to this. Also, in the present embodiment, the digital camera 101 waits for reception of a data transmission request before data transmission and data reception are performed, but there is no limitation to this, and the smart device 102 may wait for reception of a data transmission request. In this case, the digital camera 101 starts NFC communication processing and then makes a data transmission request to the smart device 102.

The description will now return to the flowchart of FIG. 4A. When NFC communication processing in step S401 ends, the control unit 205 then performs service start processing in step S402. The following describes service start processing with reference to FIG. 6. In step S601, the control unit 205 controls the wireless LAN control unit 201 to start a wireless LAN AP (Access Point) function, and then the procedure moves to step S602. In step S602, the control unit 205 starts a DHCP server function, and then the procedure moves to step S603. In step S603, the control unit 205 starts a service execution server function, and then the procedure moves to step S604. In step S604, the control unit 205 starts device announcement, and then the procedure moves to step S605. In step S605, the control unit 205 starts device searching, and then ends the service start processing. Note that it is envisioned that the device announcement and device searching are performed using SSDP, which is a service discovery protocol. There is no limitation to this, and mDNS or the like make be used.

The description will now return to FIG. 4A. In step S403, the control unit 205 determines whether or not device information has been acquired by NFC communication (proximity acquisition determination). The procedure moves to step S404 if device information has been acquired, and moves to step S408 if device information could not be acquired. Note that it is envisioned that the determination of whether or not device information has been acquired is made by determining whether or not NFC communication processing was successful, but there is no limitation to this, and the determination may be made based on the validity of the data in the acquired device information, for example. The following description in the present embodiment is based on the assumption that device information was acquired. In step S404, the control unit 205 determines whether or not a service information acquisition request has been received. The procedure moves to step S405 if a service information acquisition request has been received, and moves to step S406 if a service information acquisition request has not been received. In step S405, the control unit 205 makes a response indicating that a connecting destination is being selected, and then the procedure moves to step S406. In step S406, it is determined whether or not an IP address allocation response has been completed. The procedure moves to step S407 if allocation has been completed, and returns to step S404 if allocation has not been completed. In step S407, the control unit 205 performs high-speed connection processing using the wireless LAN. Note that in the present embodiment, device cooperation processing is unconditionally continued if device information acquisition failed, that is to say if NFC communication processing failed, but a determination may be made as to whether or not processing is to be continued depending on the cause of the NFC communication processing failure. For example, processing is continued if an NFC communication interruption occurred, whereas processing is ended if data loss occurred due to a communication error. Also, the determination of whether or not NFC communication processing was successful is performed after the execution of service start processing, but the determination may be made before the execution of service start processing. According to this configuration, if NFC communication fails and device cooperation processing is to be ended, it can be immediately ended without executing unnecessary processing.

Figure 7:
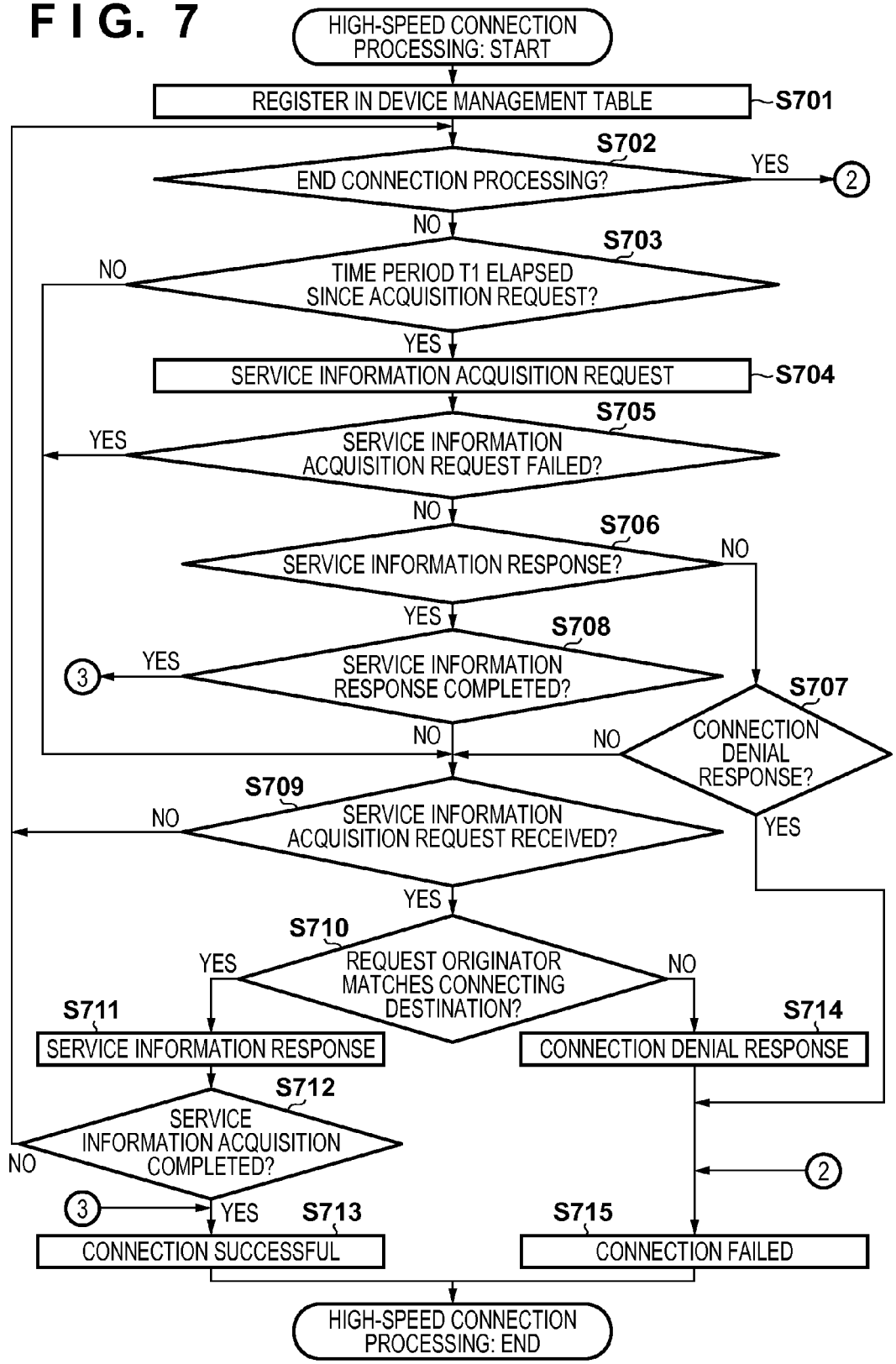
FIG. 7 is a flowchart of high-speed connection processing executed by the digital camera and the smart device.

The following describes high-speed connection processing in step S407 with reference to the flowchart of FIG. 7. In step S701, the control unit 205 registers the device information acquired by NFC communication in the device management table, and then the procedure moves to step S702. At this time, the control unit 205 sets the registration state 1012 in the device management table 1000 so as to indicate the state of manual registration by NFC. In step S702, the control unit 205 determines whether or not connection processing is to be ended. If connection processing is not to be ended, the procedure moves to step S703, whereas if connection processing is to be ended, the procedure moves to step S715, in which the control unit 205 determines that the connection failed, and then ends the high-speed connection processing. Note that it is envisioned that the determination of whether or not connection processing is to be ended is made based on whether or not a cancel instruction has been given by a user operation, but there is no limitation to this. For example, this determination may be made based on the elapsed time since the start of connection processing, the number of times that a service information acquisition request has been made, or the like. Accordingly, if the counterpart device cannot perform service start processing for a certain period of time due to waiting for the input of information from the user or the like, it is possible to stop making unnecessary service information acquisition requests without needing user awareness. Next, in step S703, the control unit 205 determines whether or not a time period T1 has elapsed since the previous service information acquisition request was made. The procedure moves to step S704 if the time period T1 has elapsed, and moves to step S709 if this time period has not elapsed. Note that it is envisioned that the time period T1 is set to 100 ms in the present embodiment, but there is no limitation to this, and this time period may be set to a smaller value. In this way, by setting the time period T1 to a sufficiently small value if device information was acquired using NFC communication, it is possible to shorten the time required for connection processing. In step S704, a service information acquisition request is made, and then the procedure moves to step S705. In step S705, the control unit 205 determines whether or not the service information acquisition request failed. The procedure moves to step S709 if the service information acquisition request failed, and moves to step S706 if the service information acquisition request did not fail. In step S706, the control unit 205 determines whether or not the response is a service information response. The procedure moves to step S708 if the response is a service information response, and moves to step S707 if the response is not a service information response. In step S707, the control unit 205 determines whether or not the response is a connection denial response. If the response is a connection denial response, the procedure moves to step S715, in which it is determined that the connection failure occurred, and high-speed connection processing is ended, whereas if the response is not a connection denial response, the procedure moves to step S709. In step S708, the control unit 205 determines whether or not the service information response has been completed. If the response has been completed, the procedure moves to step S713, in which it is determined that the connection was successful, and high-speed connection processing is ended, whereas if the response has not been completed, the procedure moves to step S709. In step S709, the control unit 205 determines whether or not a service information acquisition request has been received. The procedure moves to step S710 if a service information acquisition request has been received, and returns to step S702 if a service information acquisition request has not been received. In step S710, the control unit 205 determines whether or not the service information acquisition request originator matches the connecting destination. The procedure moves to step S711 if they match, and moves to step S714 if they do not match. Note that the determination of whether or not the request originator and the connecting destination match is performed by comparing the device identifier 1001 stored in the device management table 1000 with the device identifier of the acquisition request originator included in the service information acquisition request, but there is no limitation to this, and the determination may be made using the IP address or the like. In step S711, the control unit 205 makes a service information response, and then the procedure moves to step S712. In step S712, it is determined whether or not the acquisition of service information has been completed. If the acquisition has been completed, the procedure moves to step S713, in which it is determined that the connection was successful, and high-speed connection processing is ended, whereas if the acquisition has not been completed, the procedure returns to step S702. In step S714, the control unit 205 makes a connection denial response, and then the procedure moves to step S715. In step S715, it is determined that the connection failed, and then high-speed connection processing is ended.

The description will now return to FIG. 4B. In step S413, the control unit 205 determines whether or not connection processing was successful. The procedure moves to step S414 if connection processing was successful, and moves to step S421 if connection processing was not successful. In step S414, a service execution client function is started, and then the procedure moves to step S415. In step S415, the control unit 205 determines whether or not device cooperation is to be ended. The procedure moves to step S420 if device cooperation is to be ended, and moves to step S416 if device cooperation is not to be ended. Note that the determination of whether or not device cooperation is to be ended is made based on whether the user performed a button operation or power OFF operation, based on a disconnection request from the smart device 102, or the like, but there is no limitation to this. In step S416, device search processing is performed.

Figure 8:
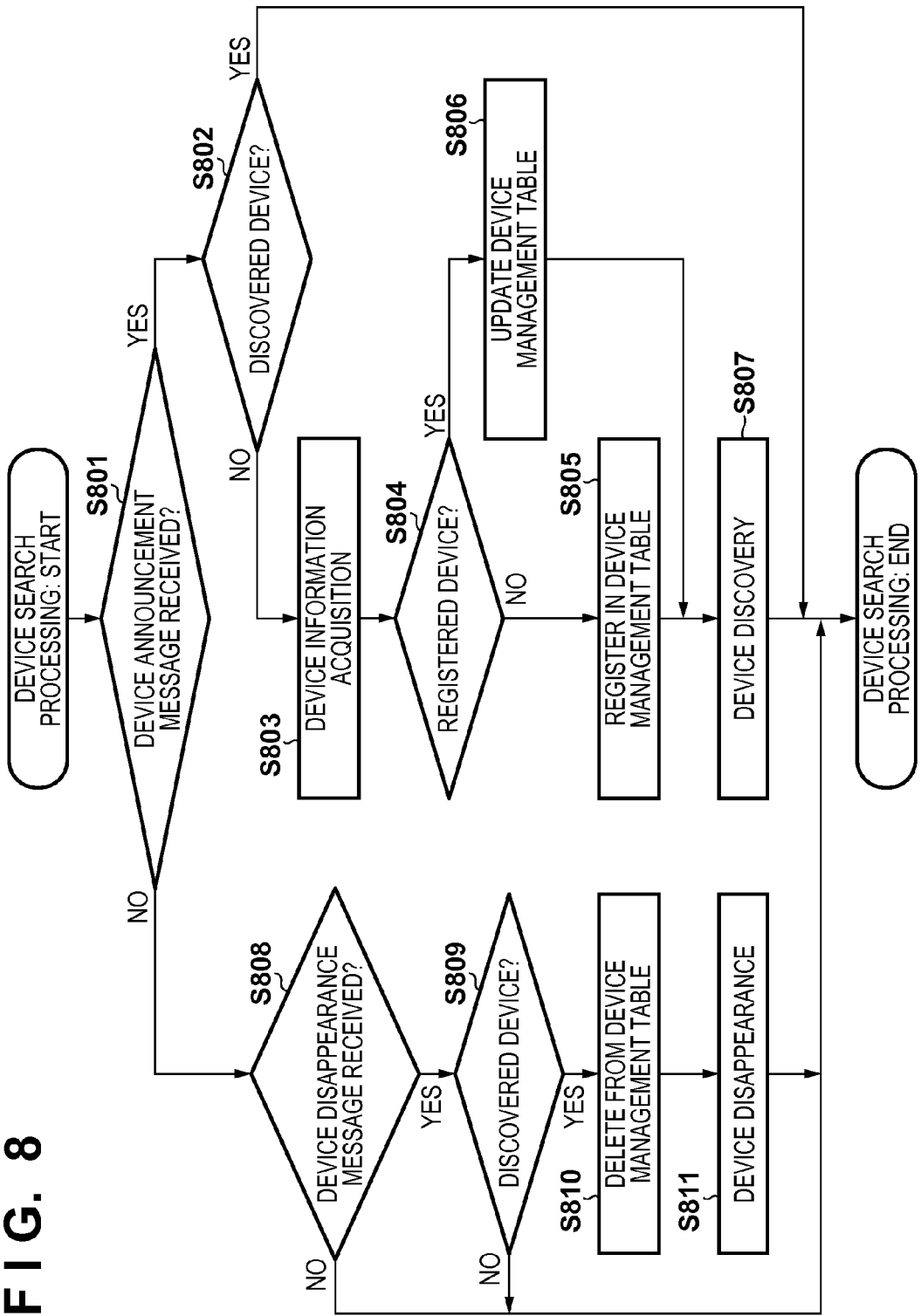
FIG. 8 is a flowchart of device search processing executed by the digital camera and the smart device.

The following describes device search processing in step S416 with reference to the flowchart in FIG. 8. In step S801, the control unit 205 determines whether or not a device announcement message has been received. The procedure moves to step S802 if a device announcement message has been received, and moves to step S808 if a device announcement message has not been received. In step S802, the control unit 205 determines whether or not the device announcement message originator is a discovered device. The device search processing is ended if the device is a discovered device, whereas the procedure moves to step S803 if the device is an undiscovered device. Note that the determination of whether or not the device is a discovered device is performed by referencing the registration state 1012 in the device management table 1000. If the registration state is a state in which device information has been acquired via the wireless LAN and registered, the device is a discovered device, and if otherwise, the device is an undiscovered device. In step S803, the control unit 205 performs device information acquisition, and then the procedure moves to step S804. In step S804, the control unit 205 determines whether or not the acquired device information is already registered in the device management table. The procedure moves to step S806 if the acquired device information is already registered, and moves to step S805 if the acquired device information is not registered. In step S805, the control unit 205 registers the device information in the device management table, and then the procedure moves to step S807, in which it is determined that the device has been discovered, and device search processing is ended. In step S806, the control unit 205 updates the device management table, and then the procedure moves to step S807, in which it is determined that the device has been discovered, and device search processing is ended. Note that in the present embodiment, it is envisioned that out of the pieces of data acquired using the wireless LAN, the data that cannot be acquired by NFC communication is updated in the device management table. One example of such data is the device information acquisition URL 1011. Note that there is no limitation to this, and the data not included in the device information acquired by NFC communication may be overwritten with the data in the device information acquired using the wireless LAN. According to this configuration, the data in the device information that could not be set at the start of NFC communication can be supplemented after connection processing, and device cooperation processing can be started in advance even if some data necessary for device cooperation is not available. In step S808, the control unit 205 determines whether or not a device disappearance message has been received. The procedure moves to step S809 if a device disappearance message has been received, and device search processing is ended if a device disappearance message has not been received. In step S809, the control unit 205 determines whether or not the device disappearance message originator is a device for which device discovery has been completed. This determination need only be made by determining whether or not the device identifier indicating the originator in the device disappearance message matches a registered device identifier. The procedure moves to step S810 if the device that is the device disappearance message originator is a discovered device, and device search processing is ended if it is an undiscovered device. In step S810, the control unit 205 deletes the corresponding device from the device management table, and then the procedure moves to step S811. In step S811, it is determined that the device has disappeared, and device search processing is ended.

The description will now return to FIG. 4B. In step S417, the control unit 205 determines (confirms) whether or not the device has disappeared, that is to say, whether or not the device continues to exist. The procedure moves to step S420 if the device disappeared, and moves to step S418 if the device has not disappeared. In step S418, the control unit 205 determines whether or not a service execution request has been received. The procedure moves to step S419 if an execution request has been received, and moves to step S415 if an execution request has not been received. In step S419, the control unit 205 performs service execution, and then the procedure returns to step S415. In step S420, the service execution client function is stopped, and then the procedure moves to step S421. In step S421, the control unit 205 performs service stop processing, and then ends device cooperation processing.

Figure 9:
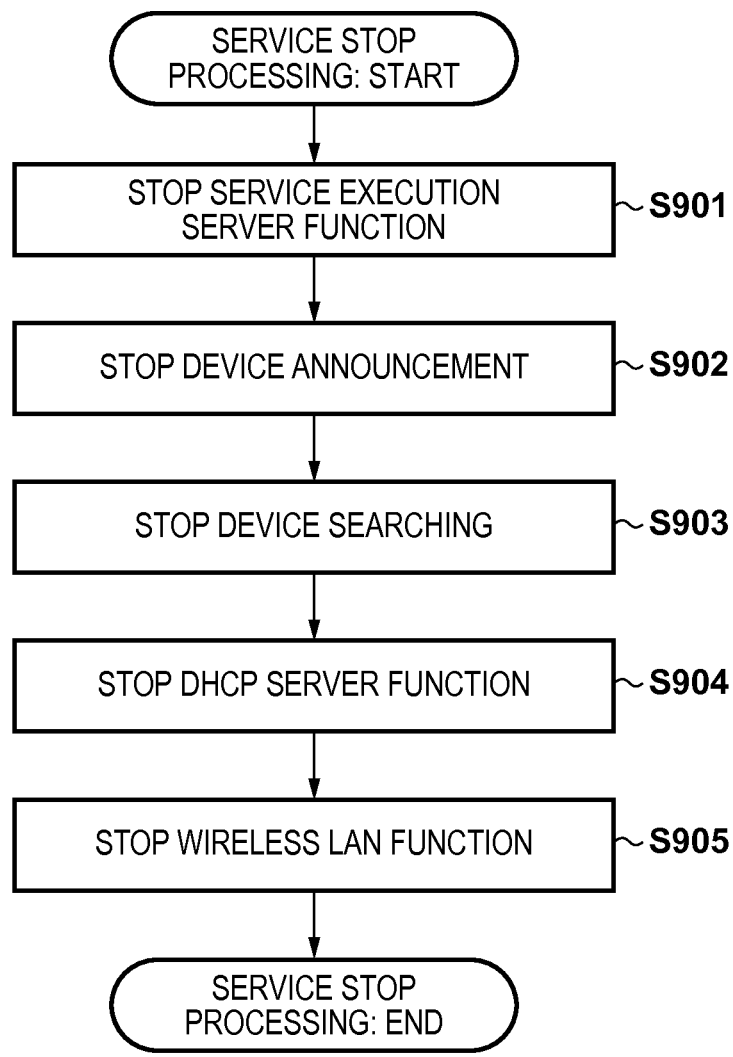
FIG. 9 is a flowchart of service stop processing executed by the digital camera and the smart device.

The following describes service stop processing in step S421 with reference to the flowchart in FIG. 9. In step S901, the control unit 205 stops the service execution server function, and then the procedure moves to step S902. In step S902, the control unit 205 stops device announcement, and then the procedure moves to step S903. Note that a device disappearance message is transmitted when stopping device announcement. In step S903, the control unit 205 stops device searching, and then the procedure moves to step S904. In step S904, the control unit 205 stops the DHCP server function, and then the procedure moves to step S905. In step S905, the control unit 205 stops the wireless LAN AP function, and then ends the service stop processing.

Figure 11A:
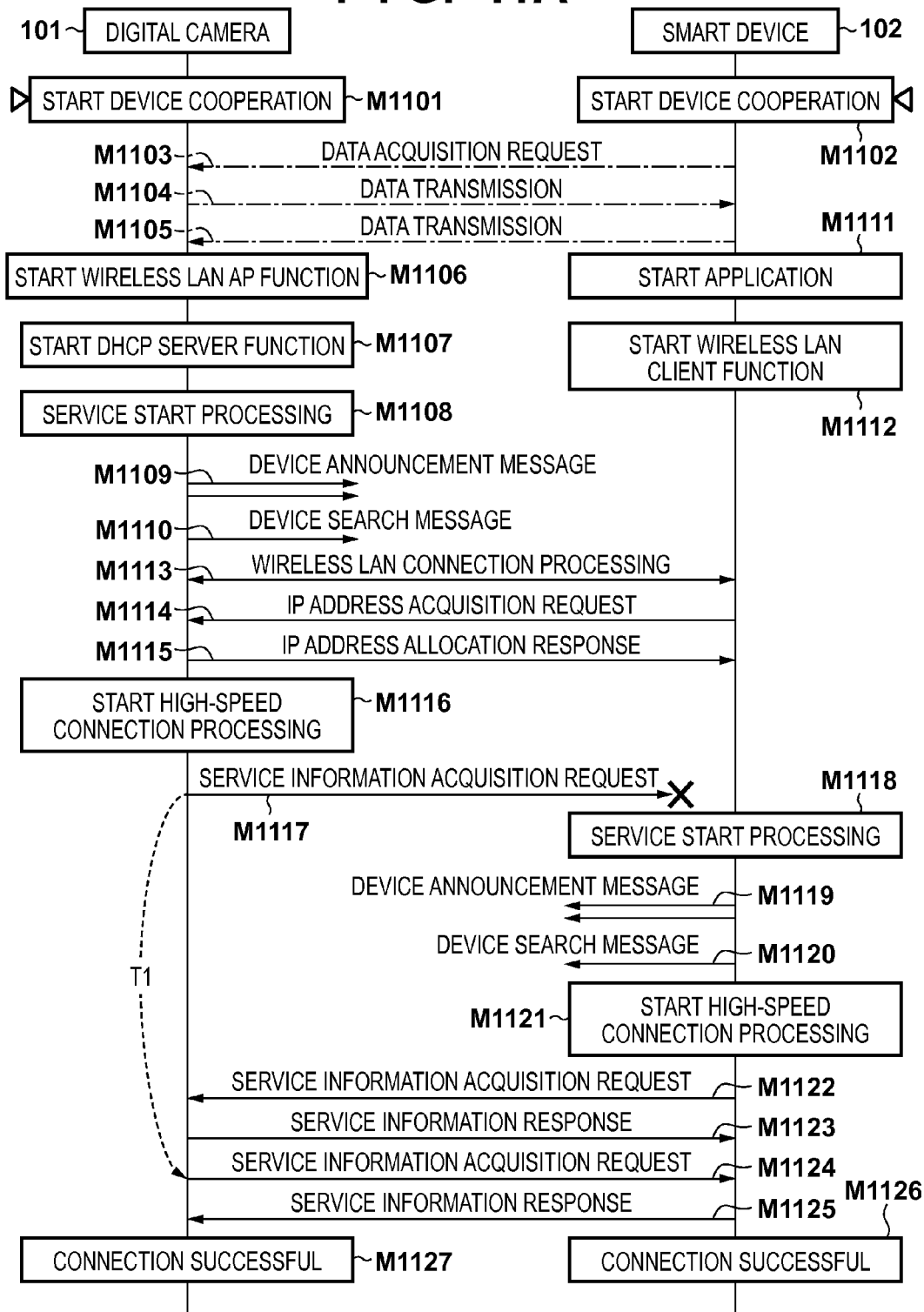
FIGS. 11A and 11B are sequence diagrams showing a sequence from the start of device cooperation between the digital camera and the smart device to service execution.
Figure 11B:
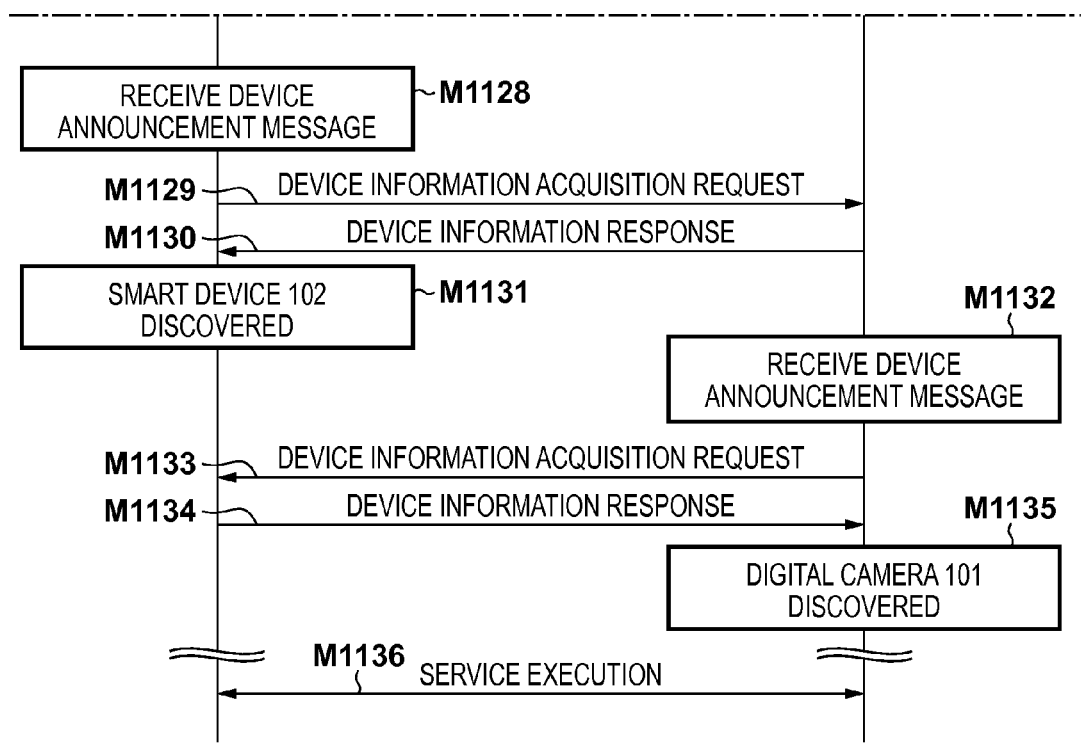

Next, an example of the processing sequence from the start of device cooperation between the digital camera 101 and the smart device 102 to service execution in the first embodiment will be described with reference to FIGS. 11A and 11B.

The user brings the NFC communication units of the digital camera 101 and the smart device 102 close to each other in order to start device cooperation (M1101 and M1102). Upon detecting the proximity of the NFC communication units, the smart device 102 transmits a data acquisition request by NFC communication (M1103), and then the digital camera 101 performs data transmission by NFC communication (M1104). The smart device 102 receives the data, and then performs data transmission by NFC communication (M1105). The digital camera 101 receives the data by NFC communication, starts the wireless LAN AP function (M1106), and starts the DHCP server function using the wireless LAN (M1107). When the DHCP server function starts, the digital camera 101 performs service start processing (M1108), and then transmits a device announcement message and transmits a device search message (M1109, M1110). The smart device 102 receives the data by NFC communication, starts an application in accordance with application startup information included in the received data (M1111), and then starts the wireless LAN client function (including the DHCP client function) (M1112). Wireless LAN connection processing is then performed between the digital camera 101 and the smart device 102 (M1113). The smart device 102 then transmits an IP address acquisition request to the digital camera 101 (M1114). The digital camera 101 receives the IP address acquisition request, transmits an IP address allocation response to the smart device 102 (M1115), and then starts high-speed connection processing (M1116). Upon starting high-speed connection processing, the digital camera 101 transmits a service information acquisition request to the IP address allocated in the IP address allocation response (M1117). Note that in the present embodiment, even if the service information acquisition request (M1117) fails, it is not determined that connection processing failed. Accordingly, connection processing can be continued even if the smart device 102 could not properly receive an IP address allocation response, and IP address setting was delayed.

The smart device 102 receives the IP address allocation response, performs service start processing (M1118), and then transmits a device announcement message and transmits a device search message (M1119, M1120). Upon starting service start processing, the smart device 102 starts high-speed connection processing (M1121), and transmits a service information acquisition request to the IP address of the digital camera 101 included in the service information acquired by NFC communication (M1122). The digital camera 101 receives the service information acquisition request, and then transmits a service information response (M1123). After the time period T1 has elapsed since the previous service information acquisition request, the digital camera 101 re-transmits a service information acquisition request to the smart device 102 (M1124). The smart device 102 receives the service information acquisition request, transmits a service information response (M1125), and determines that the connection was successful (M1126). The digital camera 101 receives the service information response, and determines that the connection was successful (M1127). The digital camera 101 receives the device announcement message transmitted by the smart device 102 (M1128), and transmits a device information acquisition request to the smart device 102 (M1129). The smart device 101 receives the device information acquisition request, and transmits a device information response (M1130). The digital camera 101 receives the device information response, and determines that the smart device 102 has been discovered (M1131). The smart device 102 receives the device announcement message transmitted by the digital camera 101 (M1132), and transmits a device information acquisition request to the digital camera 101 (M1133). The digital camera 101 receives the device information acquisition request, and transmits a device information response (M1134). The smart device 102 receives the device information response, and determines that the digital camera 101 has been discovered (M1135). The digital camera 101 and the smart device 102 then perform service execution (M1136).

In the present embodiment, the digital camera 101 attempts to discover the smart device 102 after connection processing has been completed, but it may attempt to discover the smart device before connection processing is started. The same follows in the smart device 102 as well. In this case, the device information acquired using the wireless LAN is overwritten with the device information acquired by NFC communication. According to this configuration, it is possible to eliminate any discrepancy in the device information to be used by the application.

In the present embodiment, the digital camera 101 starts the DHCP server function and uses the first allocated IP address as the IP address of the smart device 102. According to this configuration, if the smart device 102 cannot statically set its own IP address, and the IP address of the smart device 102 is not included in the device information acquired by NFC communication, the digital camera 101 can determine the IP address of the smart device 102 that is the service information acquisition request destination. On the other hand, if the IP address of the smart device 102 is included in the device information acquired by NFC communication, the digital camera 101 may transmit the service information acquisition request using that IP address. According to this configuration, it is possible to start high-speed connection processing immediately after the end of service start processing without using the DHCP server function, and it is possible to realize a further reduction in the amount of time required for connection.

Although the smart device 102 starts up an application due to NFC proximity detection in the present embodiment, the application may be started up in advance. In this case, M1111 is skipped, and the procedure is continued. According to this configuration, it is possible to start device cooperation processing without requiring the user to be aware of whether or not the application has been started up.

In the present embodiment, the digital camera 101 performs proximity detection and starts device cooperation processing when the power is ON, but a configuration is possible in which proximity detection is performed and device cooperation processing is started when the power is OFF. According to this configuration, device cooperation processing can be started without requiring the user to be aware of the power state of the digital camera 101.

Figure 12:
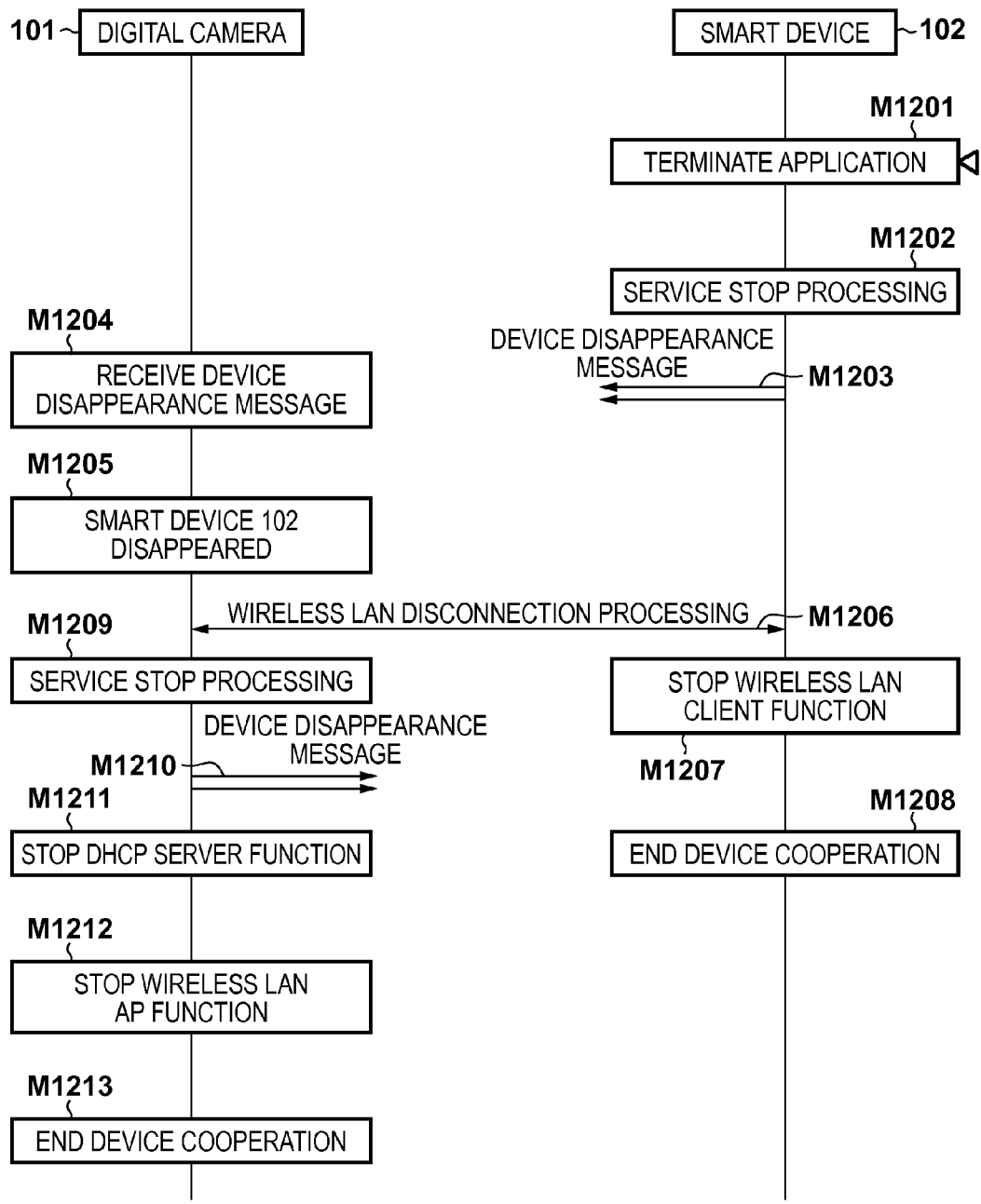
FIG. 12 is a sequence diagram showing a sequence for ending device cooperation between the digital camera and the smart device.

Next, an example of the processing sequence for ending device cooperation between the digital camera 101 and the smart device 102 in the present embodiment will be described with reference to FIG. 12.

The user performs an operation on the smart device 102 for ending device cooperation (M1201). Note that the operation for ending device cooperation is envisioned to be the pressing of a button, the move of the application to the background, the termination of the application, or the like, but there is no limitation to this. When this operation is performed, the smart device 102 performs service stop processing (M1202), and then transmits a device disappearance message (or signal) (M1203). The digital camera 101 receives the device disappearance message from the smart device 102 (M1204), and then determines that the smart device 102 disappeared (M1205). Note that although this determination is made based on the device identifier in the present embodiment, a configuration is possible in which if the IP address of the device disappearance message originator matches the IP address allocated by the DHCP function, it is determined that the device disappearance message originator is the smart device 102 that is the service provision destination. If the two do not match, the message is ignored. The digital camera 101 and the smart device 102 perform wireless LAN disconnection processing (M1206). When the wireless LAN disconnection processing has been completed, the smart device 102 stops the wireless LAN client function (M1207), and then ends device cooperation (M1208). When the smart device 102 has disappeared, the digital camera 101 performs service stop processing (M1209), and then transmits a device disappearance message (M1210). When service stop processing has been completed, the digital camera 101 stops the DHCP server function (M1211), stops the wireless LAN AP function (M1212), and then ends device cooperation (M1213).

In the present embodiment, after device cooperation processing has started, device cooperation processing is ended using a user operation as the trigger, but device cooperation processing may be automatically ended according to the operating mode of the digital camera 101 or the like when device cooperation processing is started. For example, if device cooperation processing is started while the digital camera 101 is in a playback mode, device cooperation processing may be automatically ended after transmitting, to the smart device 102, data indicating that the digital camera 101 is performing playback display. According to this configuration, it is possible to transfer desired data by merely bringing devices close to each other, without requiring the user to perform troublesome operations, and additionally, the digital camera 101 can be immediately returned to the state prior to device cooperation.

As described above, according to the present embodiment, in a communication apparatus having a proximity radio unit that performs NFC communication or the like and a radio communication unit that has a faster communication speed and longer communication distance than the proximity radio unit, even if device information is acquired using proximity radio communication, and device cooperation is started, it is possible to quickly and precisely detect (wirelessly detect) the disappearance of the counterpart device by radio communication. As a result, it is possible to shorten the time required for connection in device cooperation processing, and also end service execution at an appropriate timing.

Note that although one of the two devices is a digital camera, and the other is a smart device in the present embodiment, this is merely one example. The present invention is applicable between a digital camera and a printer, a digital camera and a storage device (image storing device), and a storage device and a printer as well, and there are no limitations on the type of device.

Second Embodiment

The first embodiment describes device cooperation processing between the digital camera 101 and the smart device 102 in the case where device information can be acquired using NFC communication. The following describes, as the second embodiment, device cooperation processing in the case where device information could not be acquired by NFC communication, with reference to FIGS. 4, 13, and 14.

The processing from step S401 to step S403 in FIG. 4A is similar to that in the first embodiment, and therefore will not be described here. In step S408, it is determined whether or not a service information acquisition request has been received. The procedure moves to step S409 if a service information acquisition request has been received, and moves to step S410 if a service information acquisition request has not been received. In step S409, a response is made indicating that a connecting destination is being selected, and then the procedure moves to step S410. In step S410, device search processing is performed, and then the procedure moves to step S411. In step S411, it is determined whether or not a device has been discovered. The procedure moves to step S412 if a device has been discovered, and returns to step S408 if a device has not been discovered. In step S412, normal connection processing is performed.

The following describes normal connection processing in step S412 with reference to the flowchart in FIG. 13. In step S1301, it is determined whether or not connection processing is to be ended, where if it is to be ended, the procedure moves to step S1307, in which it is determined that the connection failed, and normal connection processing is ended, whereas if connection processing is not to be ended, the procedure moves to step S1302. Note that in the second embodiment, the determination of whether or not connection processing is to be ended is not made using the amount of time that has elapsed since the start of connection processing, the number of times a service information acquisition request has been made, or the like, but rather is made based on a cancel operation performed by the user. Accordingly, device cooperation processing can be continued even in the case where a long time is required to discover a counterpart device in the device searching on the wireless LAN. In step S1302, it is determined whether or not a time period T2 has elapsed since the previous service information acquisition request was made. The procedure moves to step S1303 if the time period T2 has elapsed, and moves to step S1309 if it has not elapsed. In step S1303, a service information acquisition request is made, and then the procedure moves to step S1304. In step S1304, it is determined whether or not the service information acquisition request failed. If the service information acquisition request failed, the procedure moves to step S1307, in which it is determined that the connection failed, and normal connection processing is ended, whereas if the service information acquisition request did not fail, the procedure moves to step S1305. In the case where connection processing is executed upon wirelessly acquiring device information using the wireless LAN, when the acquisition of the device information has been completed, it is obvious that that device has completed service start processing, and therefore it is determined that connection processing failed if the service information acquisition request failed. In step S1305, it is determined whether or not the response is a service information acquisition response, where the procedure moves to step S1308 if the response is a service information acquisition response, and moves to step S1306 if the response is not a service information acquisition response. In step S1306, it is determined whether or not the response is a connection denial response, where if the response is a connection denial response, the procedure moves to step S1307, in which it is determined that the connection failed, and normal connection processing is ended, whereas if the response is not a connection denial response, the procedure moves to step S1309. In step S1308, it is determined whether or not the service information response has been completed. If the response has been completed, the procedure moves to step S1314, in which it is determined that the connection was successful, and normal connection processing is ended, whereas if the response has not been completed, the procedure moves to step S1309. In step S1309, it is determined whether or not a service information acquisition request has been received, where the procedure moves to step S1310 if a service information acquisition request has been received, and returns to step S1301 if a service information acquisition request has not been received. In step S1310, it is determined whether or not the service information acquisition request originator matches the connecting destination. The procedure moves to step S1311 if they match, and moves to step S1314 if they do not match. Note that the determination of whether or not the request originator and the connecting destination match is performed by comparing the device identifier 1001 registered in the device management table 1000 with the device identifier of the acquisition request originator included in the service information acquisition request, but there is no limitation to this. In step S1311, a connection denial response is made, and then the procedure returns to step S1301. In step S1312, a service information response is made, and then the procedure moves to step S1313. In step S1313, it is determined whether or not the acquisition of service information has been completed. If the acquisition has been completed, the procedure moves to step S1314, in which it is determined that the connection was successful, and normal connection processing is ended, whereas if the acquisition has not been completed, the procedure returns to step S1301.

Figure 14A:
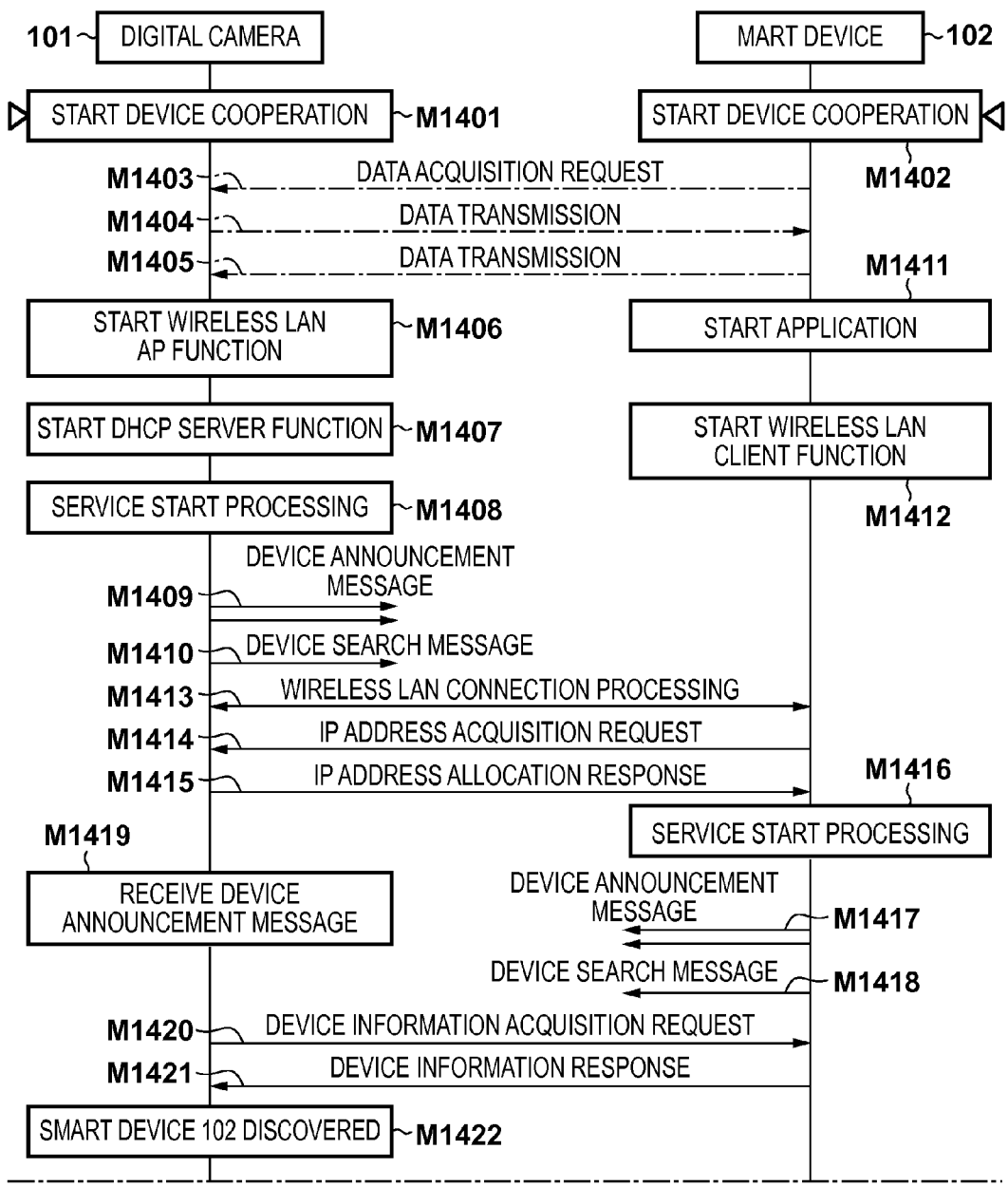
FIGS. 14A and 14B are sequence diagrams showing a sequence from the start of device cooperation between the digital camera and the smart device to service execution according to the second embodiment.
Figure 14B:
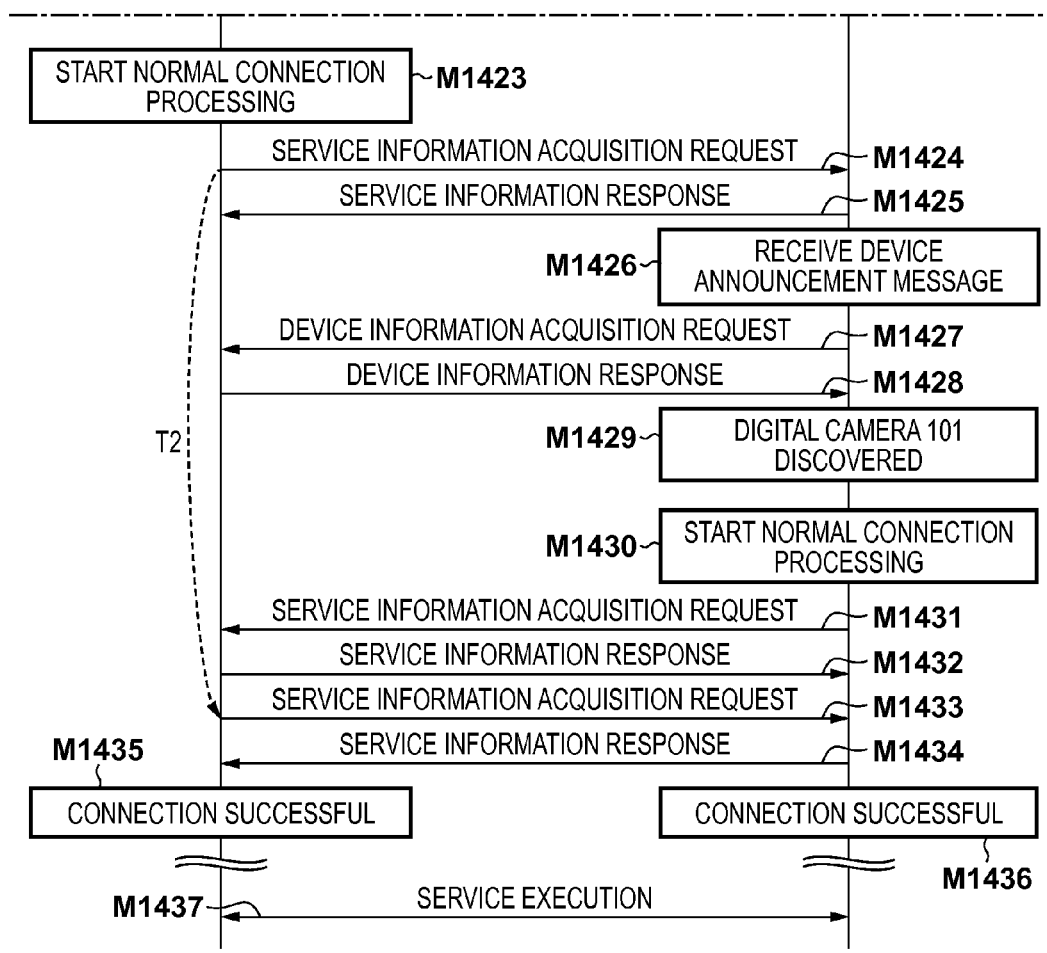

Next, an example of the processing sequence from the start of device cooperation between the digital camera 101 and the smart device 102 to service execution in the second embodiment will be described with reference to FIGS. 14A and 14B.

The processing from M1401 to M1415 is the same as the processing from M1101 to M1115 described in the first embodiment, and therefore will not be described here. Upon receiving the IP address allocation response, the smart device 102 performs service start processing (M1416), and then transmits a device announcement message and transmits a device search message (M1417, M1418). The digital camera 101 receives the device announcement message transmitted by the smart device 102 (M1419), and transmits a device information acquisition request to the smart device 102 (M1420). The smart device 102 receives the device information acquisition request, and then transmits a device information response to the digital camera 101 (M1421). The digital camera 101 receives the device information response, determines that the smart device 102 has been discovered (M1422), and then starts normal connection processing (M1423). Upon starting normal connection processing, the digital camera 101 transmits a service information acquisition request to the IP address included in the device information acquired using the wireless LAN (M1424). The smart device 102 receives the service information acquisition request, and since normal connection processing has not been started yet, then transmits a response indicating that the connecting destination is being selected to the digital camera 101 (M1425). The smart device 102 receives the device announcement message transmitted by the digital camera 101 (M1426), and transmits a device information acquisition request to the digital camera 101 (M1427). The digital camera 101 receives the device information acquisition request, and transmits a device information response (M1428). The smart device 102 receives the device information response, determines that the digital camera 101 has been discovered (M1429), and then starts normal connection processing (M1430). Upon starting normal connection processing, the smart device 102 transmits a service information acquisition request to the digital camera 101 (M1431). The digital camera 101 receives the service information acquisition request and transmits a service information response (M1432). After the time period T2 has elapsed since the previous service information acquisition request, the digital camera 101 re-transmits a service information acquisition request to the smart device 102 (M1433). The smart device 102 receives the service information acquisition request, transmits a service information response (M1434), and determines that the connection was successful (M1435). The digital camera 101 receives the service information response, and determines that the connection was successful (M1436). The digital camera 101 and the smart device 102 then perform service execution (M1437).

In the second embodiment, it is envisioned that the time period T2 is set to a larger value than the time period T1. This is because device discovery using a wireless LAN generally takes several seconds to ten or more seconds, and therefore if the service information acquisition request is transmitted at a short time interval, the number of re-transmissions will increase, and the processing load will increase. In this way, by setting an appropriate time period in the case where device information cannot be acquired by NFC communication, it is possible to avoid an unnecessary increase in the processing load.

As described above, according to the second embodiment, even if a device in the possession of the user is a device that does not have an NFC communication function, or an error occurs in NFC communication, device cooperation can be performed without requiring the user to be aware of such situations.

Note that in the above embodiments, the digital camera 101 starts the wireless LAN AP function and the DHCP server function, and the smart device 102 joins the network by starting the wireless LAN client function, but there is no limitation to this. For example, the smart device 102 may start the wireless LAN AP function and the DHCP server function, and the digital camera 101 may join the network by starting the wireless LAN client function. Also, although the network connection between the digital camera 101 and the smart device 102 is a one-on-one connection, connection via an external AP is possible.

Although NFC is used in the proximity communication unit that transmits and receives device information in the above embodiments, the present invention is not limited to this. Bluetooth (registered trademark), IrDA, or the like may be used.

Although the case where the present invention is applied to an IEEE 802.11-compliant wireless LAN is described in the above embodiments, there is no limitation to this. For example, the present invention may be carried out over another radio medium, such as wireless USB, MBOA, Bluetooth (registered trademark), UWB, or ZigBee. Also, the present invention may be carried out over a wired communication medium such as a wired LAN.

Here, MBOA is an abbreviation for Multi Band OFDM Alliance. Also, UWB includes wireless USB, wireless 1394, WINET, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-048075, filed Mar. 11, 2014 which is hereby incorporated by reference herein in its entirety.

What is claimed is:
1. A communication apparatus comprising:
a first radio communication unit that communicates with another communication apparatus;
a first acquisition unit that acquires device information regarding said another communication apparatus via the first radio communication unit;
a storage unit that stores the acquired device information via the first radio communication unit;
a second radio communication unit that communicates with said another communication apparatus, using a different radio communication system from that of the first radio communication unit;
a detection unit that, when a predetermined service is being executed with said another communication apparatus based on the device information acquired by the first acquisition unit, detects a predetermined signal to stop executing of the predetermined service via the second radio communication unit, a determination unit that, if the detection unit detects the predetermined signal, determines whether device information, included in the predetermined signal, regarding said another communication apparatus is included in the device information which has been acquired via the first radio communication unit and has been stored in the storage unit; and an execution unit that, (i) if the device information, included in the predetermined signal, regarding said another communication apparatus is included in the device information which has been acquired via the first radio communication unit and has been stored in the storage unit, executes stop processing of the predetermined service, and, (ii) if the device information, included in the predetermined signal, regarding said another communication apparatus is not included in the device information which has been acquired via the first radio communication unit and has been stored in the storage unit, does not execute the stop processing of the predetermined service.

2. The communication apparatus according to claim 1, wherein the second radio communication unit is operable to perform wireless communication with a faster communication speed and longer communication distance than the wireless communication from the first radio communication unit.

3. The communication apparatus according to claim 1, further comprising a confirming unit that confirms the existence of the other communication apparatus via the second radio communication unit.

4. The communication apparatus according to claim 3, wherein the confirming unit is arranged to confirm existence of the other communication apparatus via the second radio communication unit based on an identifier of the other communication apparatus acquired via the first radio communication unit.

5. The communication apparatus according to claim 1, wherein the device information includes at least one of an identifier, an IP address, a port number, a model name, a nickname, a vendor name, a service type, a service version, extension function information, and vendor extension information of the other communication apparatus.

6. The communication apparatus according to claim 1, further comprising a second acquisition unit that acquires device information regarding the other communication apparatus via the second radio communication unit, wherein the communication apparatus is arranged to, start the predetermined service using the device information regarding the other communication apparatus acquired by the first acquisition unit if both the first acquisition unit and the second acquisition unit acquire device information regarding the other communication apparatus.

7. The communication apparatus according to claim 1, wherein the first radio communication unit is arranged to perform communication compliant with NFC (Near Field Communication), and the second radio communication unit is arranged to perform communication compliant with IEEE 802.11 series.

8. The communication apparatus according to claim 1, wherein the detection unit detects the predetermined signal indicating stopping of the predetermined service.

9. A control method for a communication apparatus, said method comprising:

communicating by a first radio communication unit with another communication apparatus;

acquiring device information regarding said another communication apparatus via the first radio communication unit;

storing in a storage unit the acquired device information acquired via the first radio communication unit;

communicating by a second radio communication unit with said another communication apparatus, using a different radio communication system from that of the first radio communication unit;

attempting to detect a predetermined signal to stop executing of the predetermined service via the second radio communication unit if a predetermined service is being executed with said another communication apparatus based on the acquired device information;

if the predetermined signal is detected, determining whether device information, included in the predetermined signal, regarding said another communication apparatus is included in the device information which has been acquired via the first radio communication unit and has been stored in the storage unit; and performing an execution that, (i) if the device information, included in the predetermined signal, regarding said another communication apparatus is included in the device information which has been acquired via the first radio communication unit and has been stored in the storage unit, executes stop processing of the predetermined service, and, (ii) if the device information, included in the predetermined signal, regarding said another communication apparatus is not included in the device information which has been acquired via the first radio communication unit and has been stored in the storage unit, does not execute the stop processing of the predetermined service.

10. A non-transitory computer-readable storage medium storing a computer program which, when read and executed by a computer, causes the computer to execute a method comprising:

communicating by a first radio communication unit with another communication apparatus;

acquiring device information regarding said another communication apparatus via the first radio communication unit;

storing in a storage unit the acquired device information acquired via the first radio communication unit;

communicating by a second radio communication unit with said another communication apparatus, using a different radio communication system from that of the first radio communication unit;

attempting to detect a predetermined signal to stop executing of the predetermined service via the second radio communication unit if a predetermined service is being executed with said another communication apparatus based on the acquired device information;

if the predetermined signal is detected, determining whether device information, included in the predetermined signal, regarding said another communication apparatus is included in the device information which has been acquired via the first radio communication unit and has been stored in the storage unit; and performing an execution that, (i) if the device information, included in the predetermined signal, regarding said another communication apparatus is included in the device information which has been acquired via the first radio communication unit and has been stored in the storage unit, executes stop processing of the predetermined service, and, (ii) if the device information, included in the predetermined signal, regarding said another communication apparatus is not included in the device information which has been acquired via the first radio communication unit and has been stored in the storage unit, does not execute the stop processing of the predetermined service.

* * * * *